United States Patent [19]

Reed

[11] Patent Number: 4,842,737
[45] Date of Patent: Jun. 27, 1989

[54] FILTER ASSEMBLY WITH AN EXPANDABLE SHELL

[75] Inventor: Clayton L. Reed, Cortland, N.Y.

[73] Assignee: Pall Corporation, Glen Cove, N.Y.

[21] Appl. No.: 937,378

[22] Filed: Dec. 3, 1986

[51] Int. Cl.⁴ .......................................... B01D 27/08
[52] U.S. Cl. ............................. 210/321.87; 210/448; 210/452; 210/497.01; 215/12.1; 55/485; 55/486; 220/83; 220/466
[58] Field of Search ............... 210/256, 257.1, 257.2, 210/232, 445, 446, 457, 458, 448, 452, 497.01, 321.78, 321.87; 215/12.1, 12.2; 220/4 B, 4 E, 5 A, 85 B, 400, 410, 466, 415; 138/30; 55/492, 498, 500, 503, 508, 485, 486

[56] References Cited

U.S. PATENT DOCUMENTS

| | | | |
|---|---|---|---|
| 2,212,647 | 8/1940 | Nugent | 210/131 |
| 2,273,210 | 2/1942 | Lowther et al. | 285/129 |
| 2,855,103 | 10/1958 | Wilkinson | 210/315 |
| 3,147,220 | 9/1964 | Avery | 210/315 |
| 3,357,163 | 12/1967 | Burger et al. | 55/385 |
| 3,366,246 | 1/1968 | Goldsmith | 210/436 |
| 3,400,825 | 9/1968 | Shippey | 210/321 |
| 3,557,827 | 1/1971 | Marsh | 137/590 |
| 3,583,907 | 6/1971 | Borsanyi | 210/22 |
| 3,605,815 | 9/1971 | Forell | 138/30 |
| 3,679,055 | 7/1972 | Clark et al. | 210/257.2 |
| 3,745,753 | 7/1973 | Risse | 55/481 |
| 3,890,236 | 6/1975 | Harrell | 210/433 |
| 4,080,294 | 3/1978 | Edwards et al. | 210/232 |
| 4,219,426 | 8/1980 | Spekle et al. | 210/232 |
| 4,378,293 | 3/1983 | Duke | 210/282 |
| 4,404,103 | 9/1983 | Drath | 210/446 |
| 4,432,393 | 2/1984 | Mills | 138/30 |
| 4,476,023 | 10/1984 | Horikoshi et al. | 210/446 |
| 4,482,456 | 11/1984 | Grayson | 210/257.2 |
| 4,505,816 | 3/1985 | Wozniak et al. | 210/439 |
| 4,575,422 | 3/1986 | Zimmer | 210/130 |
| 4,595,497 | 6/1986 | Burrows | 210/257.2 |
| 4,617,117 | 10/1986 | Messinger et al. | 210/198.1 |
| 4,650,586 | 3/1987 | Ellis, III | 210/257.2 |
| 4,678,577 | 7/1987 | Thomas et al. | 210/441 |

FOREIGN PATENT DOCUMENTS

| | | | |
|---|---|---|---|
| 957014 | 1/1957 | Fed. Rep. of Germany | 138/30 |
| 2034090 | 12/1970 | France | |
| 522261 | 6/1940 | United Kingdom | 138/30 |
| 1389598 | 4/1975 | United Kingdom | |
| 1526877 | 10/1978 | United Kingdom | |
| 1542668 | 3/1979 | United Kingdom | |
| 1574998 | 9/1980 | United Kingdom | |

OTHER PUBLICATIONS

Specification Sheet, "Filter Housing", Model GEX-SA.
Specification Sheet, "Plastic Disposable Filter Assembly", Filterite.

Primary Examiner—Richard V. Fisher
Assistant Examiner—Wanda L. Millard
Attorney, Agent, or Firm—Leydig, Voit & Mayer

[57] ABSTRACT

The disclosure describes a fluid container comprising a fluid vessel which includes a generally cylindrical and expandable shell and a support structure which includes a generally cylindrical and rigid casing that is coaxially disposed about the shell of the fluid vessel. The shell has first and second end portions, and the casing has first and second end portions cooperatively arranged with the first and second end portions of the shell. The fluid vessel further includes first and second end caps sealed to the first and second end portions of the shell, respectively. At least one end cap has an opening which allows the fluid to flow into or out of the shell. Further, at least the first end portion of the shell has a continuously decreasing outside diameter along the axis of the shell, and the first end portion of the casing has a correspondingly continuously decreasing inside diameter. With a filter element disposed within the shell, the container may be used as a filter assembly.

21 Claims, 6 Drawing Sheets

FILTER ASSEMBLY WITH AN EXPANDABLE SHELL

FIELD OF THE INVENTION

The present invention relates to fluid containers and, further, to containers which may be used as filter assemblies.

BACKGROUND OF THE INVENTION

A high pressure or high temperature fluid maintained within or flowing through a container may exert considerable force on the container. Thus, a container must not only be chemically compatible with the fluid, but it must also have sufficient structural strength to withstand forces due to high pressures or temperatures.

Conventional containers made entirely from a plastic material may be unusable. While plastics may be very inert and, therefore, would not chemically react with the fluid, many plastics stretch or elongate unduly under increased pressure or temperature. This can create structural weaknesses in the container.

Conventional containers made entirely from metal may also be unusable. While metals may have sufficient structural strength to withstand the forces exerted by the fluid, most metals chemically react with fluids such as strong acids or agressive solvents. This can damage the container and contaminate the fluid.

Conventional containers combining metal and plastic materials may be unusable. These containers may have a plastic liner welded to the inside of a metal tank. As the pressure or temperature of the fluid increases, the plastic liner may be forced to expand but have no room for expansion within the rigid metal tank. This can cause the plastic liner to buckle within the tank, creating structural weaknesses in the container and potentially blocking the flow of fluid through the container.

SUMMARY OF THE INVENTION

The present invention provides an improved container. For example, a container embodying the present invention may be configured to compensate for expansion due to the effect of a high pressure or a high temperature fluid.

The present invention has many applications including, for example, applications in the filtering art. Accordingly, the present invention further provides a filter assembly for removing one or more substances from a fluid. The filter assembly comprises a generally cylindrical shell having first and second end portions, first and second end caps sealed to the first and second end portions of the shell, respectively, and a porous filter element disposed within the shell adjacent to the first end cap. At least one end portion of the shell has a continuously decreasing outside diameter along the axis of the shell. The filter element has upstream and downstream surfaces and a structure for directing fluid from the upstream surface to the dowmstream surface, thereby filtering the fluid. The filter assembly further comprises an inlet for channeling the fluid into the shell to the upstream surface of the filter element and an outlet for channeling the fluid from the downstream surface of the filter element out of the shell. Additionally, the filter assembly comprises a rigid casing coaxially fitted abiout the shell. The casing has first and second end portions cooperatively arranged with the first and second end portions of the shell. The end portion of the casing, which is cooperatively arranged with the end portion of the shell that has the continuously decreasing outside diameter has a correspondingly continuously decreasing inside diameter.

Thus, the present invention further provides a filter assembly which effectively filters the fluid as it flows through the filter assembly and at the same time is capable of withstanding the forces due to elevated fluid pressures and temperatures. With the shell and end caps supported within the rigid casing, a filter assembly embodying the present invention can tolerate large amounts of expansion due to fluid pressure or temperature without undue distortion or failure. The end portions of the casing and shell having the continuously decreasing diameters are preferably fashioned in the shape of a portion of a cone, i.e., the end portions are tapered. Thus, the rigid casing, which is preferably fashioned from a metal, has sufficient structural strength to overcome the forces expanding the shell and end caps, which are preferably fashioned from a plastic material. At the same time, the tapered end portions of the casing and shell allow the fluid vessel room to expand without buckling or bending.

DESCRIPTION OF PREFERRED EMBODIMENTS

Figure 1:
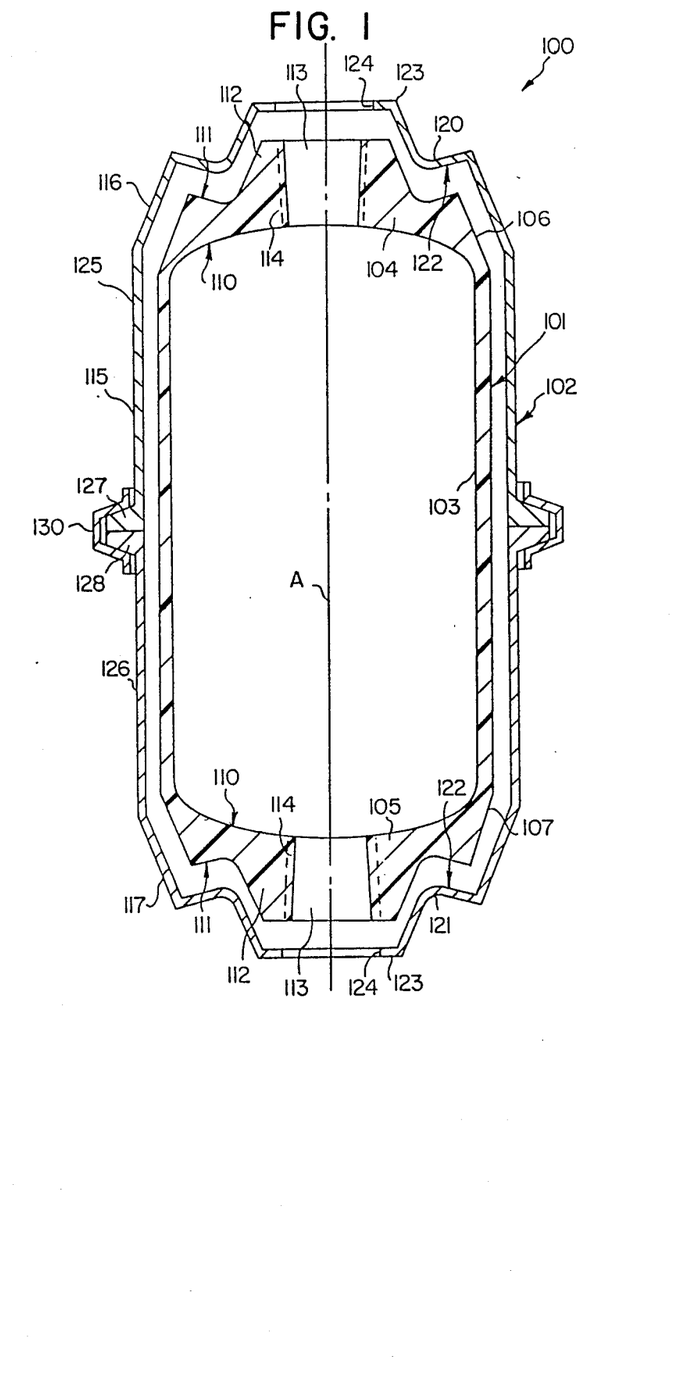
FIG. 1 is a sectional elevation view of a first exemplary pressurized fluid container embodying the present invention and showing the container in a depressurized state as viewed along line II—II of FIG. 2.
Figure 2:
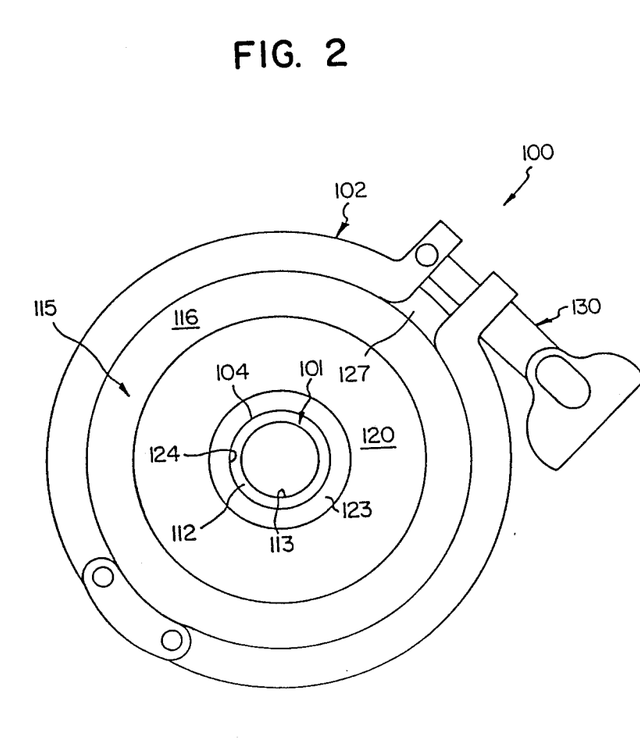
FIG. 2 is a top view of the first exemplary pressurized fluid container of FIG. 1.

As shown in FIGS. 1 and 2, a first exemplary fluid container 100 embodying the present invention generally comprises a fluid vessel 101 that contains the fluid and a support structure 102 that is fitted around the vessel 101 to provide structural support. The fluid vessel 101 comprises a generally cylindrical shell 103 and opposite end caps 104, 105. In accordance with one aspect of the invention, the shell 103 includes opposite end portions 106, 107, each having a continuously decreasing outside diameter along the axis A of the shell 103. In the first exemplary container 100, the end caps 104, 105 may be configured generally conically, i.e., such that the outside diameter decreases generally linearly. A line extending tangentially along either of the end portions 106, 107 to the axis A may intersect the axis A at any suitable angle, including, for example, 22.5 degrees.

The end caps 104, 105 are sealed to and disposed adjacent to the end portions 106, 107 of the shell 103, being disposed within and integrally formed with the end portions 106, 107. Each end cap 104, 105 has inwardly and outwardly facing surfaces 110, 111 which are generally perpendicular to the axis A of the shell 103. A protrusion 112 extends coaxially outwardly from each end cap 104, 105 and, in the first exemplary container 100, has a continuously decreasing outside diameter along the axis A of the shell 103. The protrusions 112 may also be configured conically, i.e., such that the diameter of each protrusion 112 decreases generally linearly. Again, a line extending tangentially along the protrusion 112 to the axis A may intersect the axis A at any suitable angle, including, for example, 22.5 degrees. Each protrusion 112 also has an opening 113 extending through the end cap 104, 105 and allowing fluid to flow between the interior and the exterior of the shell 103. Suitable connectors, such as internal threads 114, allow the fluid vessel 101 to be connected to fluid supply and discharge lines (not shown).

Although the various components of the fluid vessel 101 may be fashioned from any suitably impervious materials, they are preferably fashioned from thermoplastic or polymeric materials which are capable of expanding, for example, because they elongate significantly under pressure or because they have high thermal coefficients of expansion. For a destructive or aggressive fluid, such as a strong acid or solvent, the thermoplastic material should also be particularly resistant to the destructive effects of the fluid. Such expandable and resistant thermoplastic materials include fluorocarbons such as FEP or PFA. FEP is a copolymer of tetrafluoroethylene and hexafluoropropylene, PFA is a copolymer combining a carbon-fluorine main chain with perfluoroalkoxy (PFA) side chains or, more specifically, a copolymer of tetrafluoroethylene and perfluorinated vinyl ether. Both FEP and PFA are available from E. I. duPont de Nemours and Company.

The support structure 102 may be fashioned from any suitably strong, rigid material, including stainless steel or aluminum. The support structure 102 comprises a casing 115 which fits around the shell 103 of the fluid vessel 101, partially or totally enclosing the shell 103. In accordance with another aspect of th invention, the casing 115 includes first and second end portions 116, 117 arranged proximate to the first and second end portions 106, 107, respectively, of the shell 103, each end portion 116, 117 of the casing 115 having a continuously decreasing outside diameter along the axis A of the shell 103 which corresponds to the continuously decreasing outside diameter of the end portion 106, 107 of the shell 103.

The support structure 102 further includes an end restraint 120, 121 mounted to each end portion 116, 117 of the casing 115. In the first exemplary container 100, the end restraints 120, 121 are integrally formed with the end portions 116, 117 of the casing 115. The end restraints 120, 121 each have an inwardly facing surface 122 which is generally perpendicular to the axis A of the shell 103 and faces the outwardly facing surface 111 of the end caps 104, 105. An axial protrusion 123 extends outwardly from each end restaint 120, 121 and is arranged proximate to the protrusions 112 of the end caps 104, 105. Each protrusion 123 of the end restaints 120, 121 has a continuously decreasing inside diameter along the axis A of the shell 103 which corresponds to the continuously decreasing outside diameter of the protrusions 112 of the end caps 104, 105. An opening 124 in each protrusion 123 of the end restraints 120, 121 communicates with the opening 113 in each protrusion 112 of the end caps 104, 105, allowing the fluid vessel 101 to be connected to supply and discharge lines (not shown) through the support structure 102.

The casing 115 of the first exemplary container 100 includes two casing sections 125, 126. Each casing section 125, 126 terminates at one end with an end portion 116, 117 of the casing 115 and at the other end with a radially outwardly extending flange 127, 128. The flanges 127, 128 abut one another, and a releasable clamp mechanism 130 is disposed about the abutted flanges 127, 128 to allow the casing 115 to be releasably mounted about the shell 103.

Figure 3:
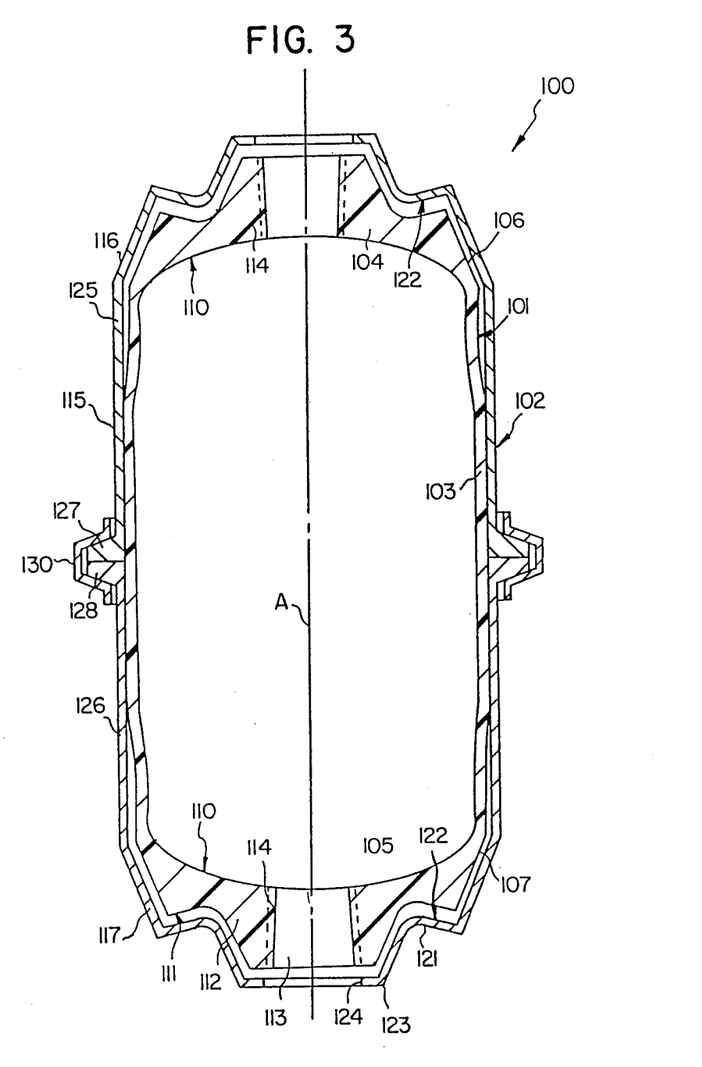
FIG. 3 is a sectional elevation view of the first exemplary pressurized fluid container of FIG. 1 showing the container in a partially pressurized state as viewed along line II—II of FIG. 2.

In the preferred mode of operation, supply and discharge lines (not shown) are threaded to the threaded connectors 114 of the end caps 104, 105 of the fluid vessel 101. The fluid vessel 101 is preferably dimensioned to be a loose fit within the support structure 102 prior to charging the vessel 101 with fluid (actual tolerances between the fluid vessel 101 and the support structure 102 are exaggerated for purposes of illustration in FIGS. 1 and 3). This not only allows the fluid vessel 101 to be easily inserted into the support structure 102, but it also avoids the expensive machining that would be necessary for close tolerances. Once the fluid vessel 101 is charged with fluid, the shell 103 of the fluid vessel 101 expands radially against the casing 115 of the support structure 102 due to the pressure of the fluid, the temperature of the fluid, or both, as shown in FIG. 3. In this manner, the radial forces of expansion on the fluid vessel 101 are transmitted to the support structure 102 where they are resisted by circumferential tension in the rigid casing 115.

Figure 4:
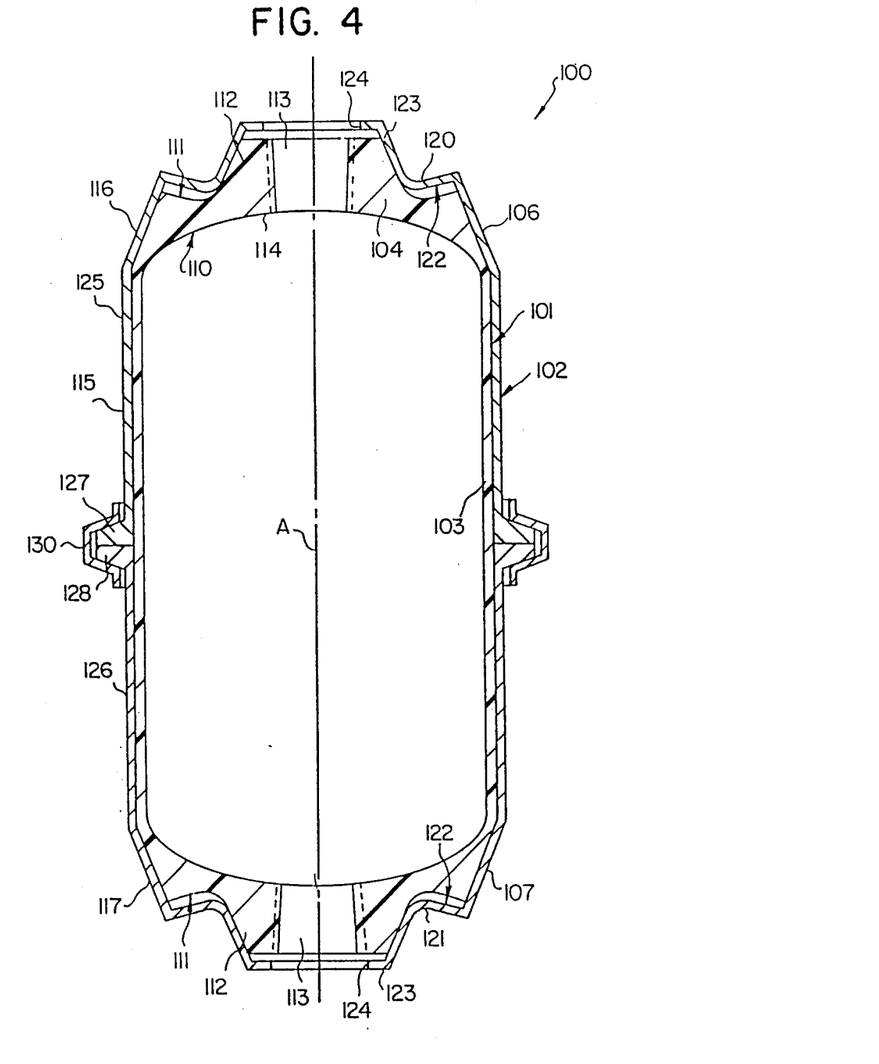
FIG. 4 is a sectional elevation view of the first exemplary pressurized fluid container of FIG. 1 showin the container in a fully pressurized state as viewed along line II—II of FIG. 2.

The fluid vessel 101 also expands axially. In accordance with a further aspect of the invention, as the fluid vessel 101 expands axially, the end portions 106, 107 of the shell 103 are forced against and axially along the end portions 116, 117 of the casing 115, as shown in FIG. 4. Since the end portions 116, 117 of the casing 115 have continuously decreasing inside diameters along the axis A of the shell 103, the force of axial expansion of the fluid vessel 101 is resisted by the axial component of the reactive forces in the end portions 116, 117 of the casing 115. Further, a radial component of this reactive force is exerted inwardly by the end portions 116, 117 of the casing 115 on the end portions 106, 107 of the shell 103 and, hence, on the end caps 104, 105. This inwardly directed radial force, which increases with the axial expansion of the fluid vessel 101, prevents undue bending stresses at the junction of the shell 103 and the end caps 104, 105 which can rupture a fluid vessel not supported in accordance with the invention. It also tightens the threaded connection 114 of the end caps 104, 105 around the supply and discharge lines (not shown).

In accordance with a further aspect of the invention, the protrusions 123 on the end restraints 120, 121 cooperate with the protrusions 112 on the end caps 104, 105 in a manner analogous to the manner in which the end portions 116, 117 of the casing 115 cooperate with the end portions 106, 107 of the shell 103. Thus, as the fluid vessel 101 expands axially, the protrusions 123 of the rigid end restraints 120, 121 exert a reactive force on the protrusions 112 of the end caps 104, 105, and this reactive force has an axial component, which resists further axial expansion of the fluid vessel 101, and a radial component, which tightens the threaded connections 114 of the end caps 104, 105 around the supply and discharge lines (not shown).

As shown in FIG. 4, the axial extension of the end portions 116, 117 of the case 115 and the axial extension of the protrusions 123 of the end caps 104, 105 are preferably sufficient to prevent the outwardly facing surfaces 111 of the end caps 104, 105 from contacting the inwardly facing surfaces 122 of the end restrains 120, 121 during normal operating pressures or temperatures. This allows the fluid vessel 101 room to expand within the support structure 102 with increasing pressures or temperatures and, therefore, prevents the fluid vessel 101 from buckling. However, the rigid end restraints 120, 121 serve to limit the axial expansion of the fluid vessel during abnormal pressures or temperatures.

Once fluid flow has been discontinued through the supply and discharge lines (not shown), the contaminated fluid vessel 101 may be easily discarded by simply loosening the clamp mechanism 130, separating the casing sections 125, 126, and then removing the fluid vessel 101 from the support structure 102. A new fluid vessel 101 may then be conveniently and safely inserted into one of the casing sections 125, the flanges 127, 128 of the casing sections may then be abutted, and the clamp mechanism 130 may then be tightened around the reusable casing 115.

Figure 5:
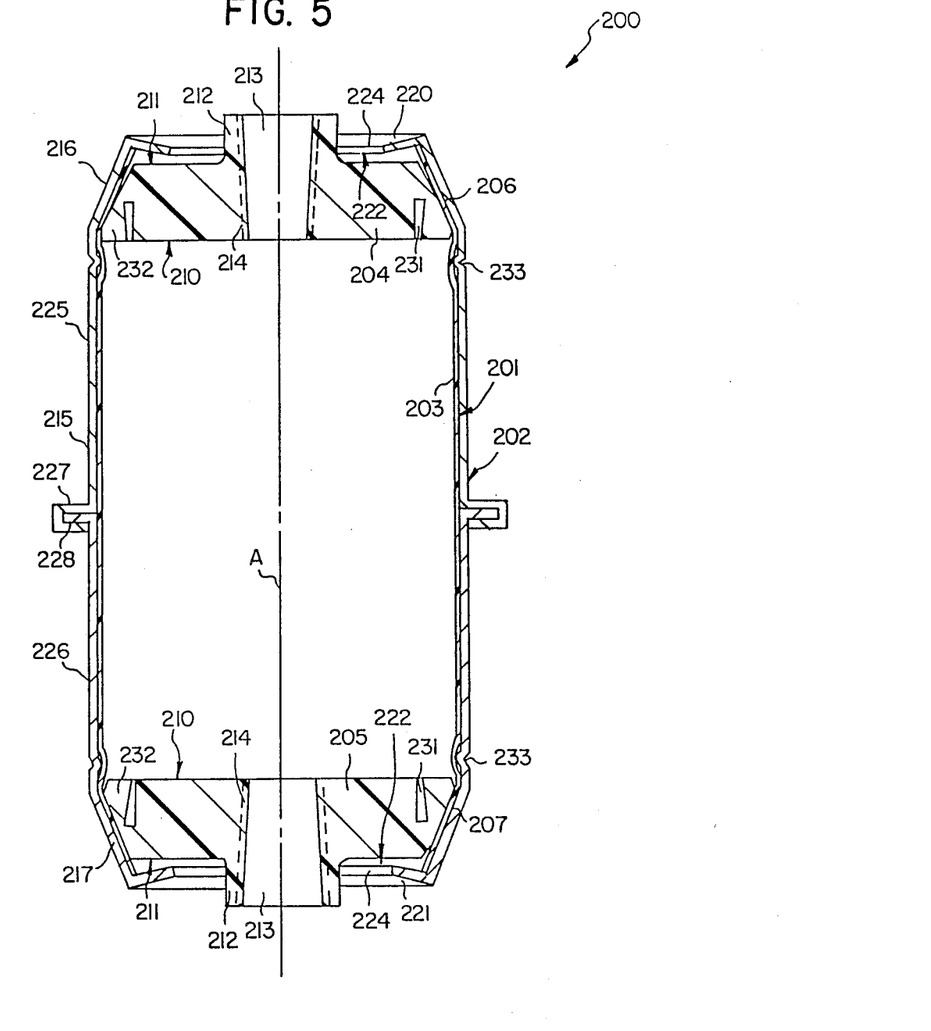
FIG. 5 is a sectional elevation view of a second exemplary pressurized fluid container embodying the present invention in which the end caps are not fixedly joined to the shell.

As shown in FIG. 5, a second exemplary filter container 200 also includes a fluid vessel 201 and a support structure 202. (Components of the second exemplary container 200 which are analogous to components of the first exemplary container 100 are identified by reference numerals which are one hundred greater than the reference numerals of the analogous components of the first exemplary container 100.)

A fluid vessel 201 of the second exemplary container 200 is similar to that of the first exemplary container 100. However, while the end caps 204, 205 of the second exemplary container 200 do include protrusions 212, the protrusions 212 are preferably not conical. Further, while the end caps 204, 205 are sealed to and disposed adjacent to the end portions 206, 207 on the shell 203, the end caps 204, 205 are not integrally formed with nor fixedly joined to the end portions 206, 207. Rather, the end caps 204, 205 remain free to slide axially along the shell 203.

In the second exemplary container 200, the inside diameter of the end portions 206, 207 of the shell 203 continuously decreases in a manner corresponding to the outside diameter of the end portions 206, 207. When the end caps 204, 205 are not within the shell 203, the maximum diameter of the end caps 204, 205 is greater than the maximum inside diameter of the shell 203. However, the inwardly facing surface 210 of each end cap 204, 205 has a circular groove 231. This groove 231 defines a sealing portion 232 along the periphery of each end cap 204, 205 which may be resiliently compressed, decreasing the maximum diameter of the end cap 204, 205 and allowing the end cap 204, 205 to fit within the shell 203. Within the shell 203, the sealing portion 232 expands against the shell 203, sealing the end caps 204, 205 against the shell 203 but allowing the end caps 204, 205 to slide axially along the shell 203. As an alternative to the circular groove 231 defining the sealing portion 232, each end cap 204, 205 may have a peripheral groove which contains an O-ring (not shown).

The support structure 202 of the second exemplary container 200 is similar to that of the first exemplary container 100. However, the end restraints 220, 221 of the second exemplary container 200 have no protrusions. Further, the support structure 202 has no clamping mechanism. Instead, the abutting flanges 227, 228 are fixedly joined to one another, for example, by interlocking the flanges 227, 228 and, therefore, the fluid vessel 201 is not separately disposable. Another difference between the support structures 102, 202 of the first and second exemplary containers 100, 200 are circumferential constrictions 233 in the casing 215 of the second exemplary container 200. The circumferential constrictions 233 are positioned near the end portions 216, 217 of the casing 215 and serve to prevent the end caps 204, 205 from being inadvertently moved axially inwardly away from the end portions 216, 217 of the casing 215 during shipping or installation.

To assemble the second exemplary container 200, the end caps 204, 205 are inserted into the shell 203 before the end portions 206, 207 are formed and are forced back along the axis A toward the center portion of the shell 203. The end portions 206, 207 of the shell 203 are then formed. The fluid vessel 201 is then placed within the support structure 202 and the abutting flanges 227, 228 are fixedly joined. Finally, the end caps 204, 205 are pulled axially in opposite directions over the constrictions 233 and into engagement with the end portions 206, 207 of the shell 203. The constrictions 233 are dimensioned to resist inadvertent movement but to allow forcing the end caps against the end portions 206, 207 of the shell 203.

The preferred mode of operation of the second exemplary container 200 is similar to that of the first exemplary container 100. Once the supply and discharge lines (not shown) are threaded to the threaded connectors 214 of the end caps 204, 205, and the fluid vessel 201 is charged with fluid, the shell 203 of the fluid vessel 201 expands radially against the rigid casing 215 of the support structure 202 while the end caps 204, 205 are forced against and axially along the end portions 206, 207 of the shell 203. The end portions 206, 207 of the shell 203, in turn, are forced against the end portions 216, 217 of the rigid casing 215. The end portions 216, 217 of the casing 215 thus exert a reactive force that has an axial component, which resists further axial sliding by the end caps 204, 205, and that has an inwardly directed radial component which tightens the threaded connections 214 around the supply and discharge lines (not shown).

Figure 6:
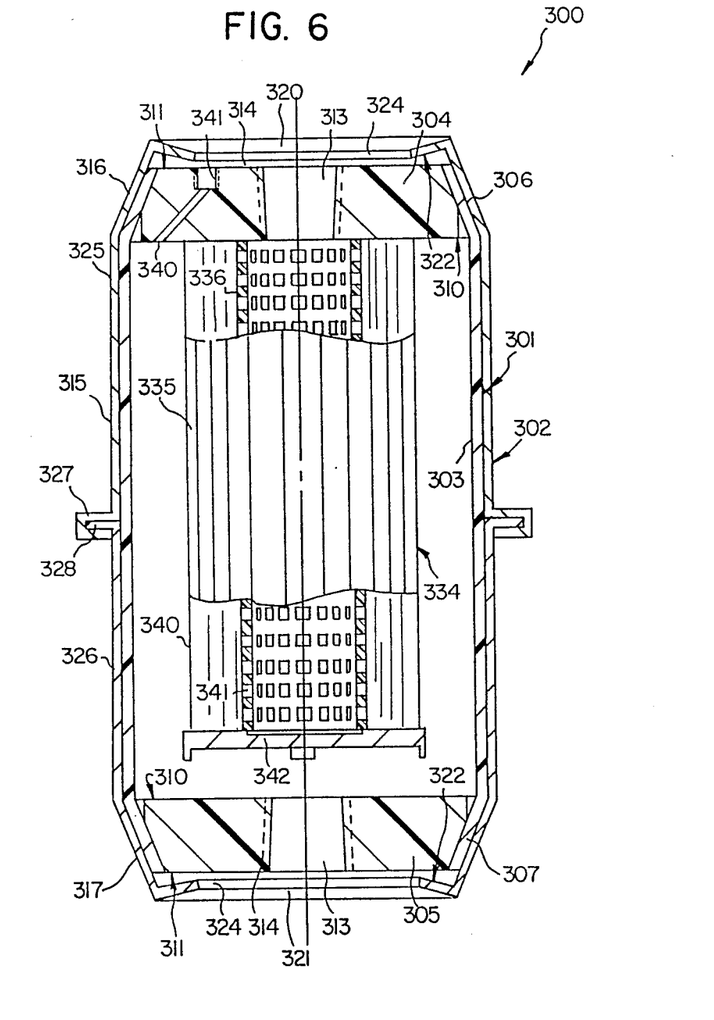
FIG. 6 is a sectional elevation view of an exemplary filter assembly embodying the present invention.

A fluid container according to the present invention has many applications including, for example, applications in the filtering arts. Thus, the third exemplary container embodying the invention constitutes a filter assembly 300, as shown in FIG. 6. The exemplary filter assembly 300 also includes a fluid vessel 301 and a support structure 302 and further includes a filter element 334. (Components of the exemplary filter assembly 300 which are analogous to components of the first exemplary container 100 are identified by reference numerals which are two hundred greater than the reference numerals of the analogous components of the first exemplary container 100.)

The fluid vessel 301 of the exemplary filter assembly 300 is similar to that of the first exemplary container 100. However, while the end caps 304, 305 are sealed to and disposed adjacent to the end portions 306, 307 of the shell 303, the end caps 304, 305 are not integrally formed with the end portions 306, 307. Rather, the end caps 304, 305 are fixedly joined to the end portions 306, 307 of the shell 303 by any conventional means, such as heat sealing or an adhesive. Further, the end caps 304, 305 of the exemplary filter assembly 300 have no protrusions.

The support structure 302 of the exemplary filter assembly 300 is also similar to that of the first exemplary container 100. However, the end restraints 320, 321 of the exemplary filter assembly 300 have no protrusions. Further, the support structure 302 has no clamping mechanism, the abutting flanges 327, 328 being fixedly joined to one another similar to the support structure 202 of the second exemplary container 200.

The filter element may be variously configured and may be structured to remove any of a variety of substances from the fluid without departing from the scope of the invention. For example, the filter element may be configured as a solid cylinder sealed against the shell 303 to direct fluid axially through the filter element. Further, the filter element may be structured to include a sorbent material to sorb one or more components from the pressurized fluid.

In the exemplary filter assembly 300, the supply line (not shown) may be attached to the threaded connector 314 of the second end cap 305 while the discharge line (not shown) may be attached to the threaded connector 314 of the first end cap 304. The filter element 334 then preferably includes a hollow, cylindrical filter 335 surrounding a perforated core 336. The outside, or upstream, surface 340 of the filter 335 then communicates with the supply line (not shown) via the opening 313 in the second end cap 305 while the inside, or downstream, surface 341 of the filter 335 communicates with the discharge line (not shown) via the opening 313 in the first end cap 304. The perforated core 336 serves to support the filter 335 against the differential pressure across the upstream and downstream surfaces 340, 341 of the filter 335.

Both the filter 335 and the perforated core 336 are joined at one end to a blind end cover 342. The other end of the filter 335 and the core 336 are preferably coaxially joined directly to the first end cap 304, the opening 313 in the first end cap 304 communicating directly with the interior of the hollow filter element 334. Alternatively, the filter 335 and the core 336 may be joined to a separate annular end cap which is in turn mounted to the first end cap 304. The filter 335 and the perforated core 336 may be joined to the first end cap 304 and the blind end cover 342 in any suitable manner, for example, by an adhesive or by heat sealing.

The filter 335 may include any suitably porous filter medium which is fabricated from a material compatible with the fluid being filtered. For example, the filter may include a porous membrane or a microfibrous, nonpleated cylindrical filter medium such as that available from Pall Corporation under the trademark PROFILE. In the exemplary filter assembly 300, the filter 335 comprises a composite including a nonwoven microfibrous layer disposed upstream and downstream from one or two layers of a microporous membrane. The membrane preferably has an absolute pore rating in the range from about 0.1 micrometer to about 1.0 micrometer for filtering submicronic particles. The upstream and downstream microfibrous layers provide support and drainage for the membrane. Further, the composite filter 335 is preferably arranged in a longitudinally pleated configuration to increase the upstream surface area 340 of the filter.

The filter element may be fashioned from any suitable material compatible with the fluid being filtered. For a destructive or aggressive fluid, the filter element 334, as well as the fluid vessel 301, is preferably fashioned from a fluoropolymeric material. For example, the perforated core 336 and the blind end cover 342 may be fashioned from a PFA. The microporous membrane is preferably fashioned from a polytetrafluoroethylene (PTFE), such membranes being commercially available under the trademark EMFLON from Pall Corporation. Further, the nonwoven microfibrous support and drainage layers are preferably fashioned from PTFE fibers bonded by FEP.

The preferred mode of operation of the exemplary filter assembly 300 is analogous to that of the first exemplary container 100. Once the supply and discharge lines (not shown) are threaded to the threaded connectors 314 of the end caps 304, 305 and the fluid vessel 301 is charged with fluid. A vent 340 with a threaded bore 341 allows air to be bled from the fluid vessel 301. The vent 340 may then be sealed with a threaded plug (not shown). Once charged, the fluid vessel 301 expands radially and axially against the rigid casing 315 of the support structure 302. The end caps 304, 305 are forced against and axially along the end portions 316, 317 of the rigid casing 315. The end portions 316, 317 of the casing 315 then exert a reactive force that has an axial component which resists further axial expansion of the fluid vessel 301 and that has an inwardly directed radial component which prevents undue bending stresses at the junction of the shell 303 and the end caps 304, 305 and which tightens the threaded connections 314 around the supply and discharge lines (not shown).

Further, fluid flowing through the exemplary filter assembly 300 enters through the inlet opening 313 in the second end cap 305, flows into the shell 303 around the filter element 334, and then passes radially inwardly through the filter 335 where one or more substances are removed. From the interior of the filter element 334, the fluid flows axially through the filter element 334 and then exits the exemplary filter assembly 300 through the outlet opening 313 in the first end cap 304. Alternatively, the fluid may be directed through the opening 313 in the the first end cap 304, radially outwardly through the filter 335 into the shell 303, and then through the opening 313 in the second end cap 305. For a radially outward flow through the filter element 334, certain well known structural changes may be required of the filter element, including the addition of a perforated cage disposed coaxially about the filter 335.

Once the filter element 334 becomes clogged, the entire exemplary filter assembly 300 may be replaced. Alternatively, abutting flanges joined by a clamp mechanism similar to those of the first exemplary container 100 would allow the support structure 302 to be disassembled and a new fluid vessel 301 and filter element 334 installed. A reusable support structure would b highly economical.

Although the invention has been described in terms of several exemplary embodiments, it is not limited to those embodiments. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention.

What is claimed is:

1. A filter assembly for removing one or more substances from a fluid flowing through the filter assembly, the filter assembly comprising:
   a generally cylindrical shell having an axis and first and second end portions, at least one end portion having a continuously decreasing outside diameter along the axis of the shell;
   first and second end caps sealingly disposed at the first and second end portions of the shell, respectively;
   a porous filter element disposed within the shell adjacent to the first end cap, the filter element including upstream and downstream surfaces and means for directing fluid from the upstream surface to the downstream surface;
   inlet and outlet means for channeling the fluid into the shell to the upstream surface of the filter element and for channeling the fluid from the downstream surface of the filter element out of the shell, respectively; and
   a rigid casing coaxially disposed about the shell and having first and second end portions cooperatively arranged with the first and second end portions, respectively, of the shell wherein the end portion of the casing cooperatively arranged with the end portion of the shell which has the continuously decreasing outside diameter has a correspondingly continuously decreasing inside diameter and wherein at least one end portion of the casing has an opening communicating with the exterior of the casing.

2. The filter assembly of claim 1 wherein the filter element comprises a hollow filter having first and second ends and a blind end cover mounted to the second end of the filter, the first end of the filter being mounted to the first end cap.

3. The filter assembly of claim 2 wherein the upstream and downstream surfaces of the filter element comprise the outside and inside surfaces of the filter, respectively, and wherein the filter element further includes a perforated cylindrical structure disposed adjacent to the inside surface of the filter for supporting the filter.

4. The filter assembly of claim 3 wherein the filter includes a composite having at least one layer of a microporous filtering membrane layer disposed between an upstream and downstream non-woven microfibrous layers for supporting and draining the membrane layer.

5. The filter assembly of claim 4 wherein the shell, the first and second end caps, and the filter element are each fashioned from a fluoropolymeric material.

6. The filter assembly of claim 5 wherein the shell, the first and second end caps, the perforated structure, and the blind end cover are fashioned from PFA and wherein the membrane layer and the nonwoven microfibrous layers are fashioned from PTFE.

7. The filter assembly of claim 2 wherein the upstream and downstream surfaces of the filter element respectively comprise the outside and inside surfaces of the filter, wherein the inlet means includes an opening in the second end cap which communicates with the outside surface of the filter, and wherein the outlet means includes an opening in the first end cap which communicates with the inside surface of the filter.

8. The filter assembly of claim 1 further comprising releasable means for mounting the casing about the shell.

9. The filter assembly of claim 8 wherein the releasable means comprises a clamp mechanism.

10. The filter assembly of claim 9 wherein the casing includes first and second cylindrical sections respectively terminating at one end with the first and second end portions of the casing and at the other end with radially outwardly extending first and second flanges, the first flange abutting the second flange, and wherein the clamp mechanism is disposed about the abutting flanges.

11. The filter assembly of claim 1 further comprising first limiting means to the first end portion of the casing for limiting axial expansion of the shell and end caps.

12. The filter assembly of claim 11 wherein the first end cap includes an outwardly facing surface generally perpendicular to the axis of the shell and wherein the first limiting means includes an end restraint mounted to the first end portion of the casing and including an inwardly facing surface of the end restraint facing the outwardly facing surface of the first end cap.

13. The filter assembly of claim 1 wherein the first end cap includes an outwardly extending axial protrusion having a continuously decreasing diameter along the axis of the shell and wherein the filter assembly further comprises an end restraint mounted to the first end portion of the casing and including an outwardly extending axial protrusion having a continuously decreasing diameter along the axis of the shell, the continuously decreasing diameter of the protrusion of the end restraint corresponding to the continuously decreasing diameter of the protrusion of the first end cap.

14. The filter assembly of claim 1 wherein the first end portion of the casing extends axially beyond the first end portion of the shell.

15. The filter assembly of claim 1 wherein at least one end cap is integrally formed with one end portion of the shell.

16. The filter assembly of claim 1 wherein at least one end cap is fixedly joined to one end portion of the shell.

17. The filter assembly of claim 1 wherein at least one cap slidinly engages one end portion of the shell.

18. The filter assembly of claim 17 wherein a maximum diameter of the sliding end cap is greater than a maximum inside diameter of the corresponding end portion of the shell and wherein the end cap includes groove means for allowing resilient reduction of the maximum diameter of the end cap.

19. The filter assembly of claim 1 wherein the shell is fashioned from an expandable thermoplastic material.

20. The filter assembly of claim 19 wherein the expandable thermoplastic material comprises a fluoropolymer.

21. The filter assembly of claim 20 wherein the fluoropolymer comprises FPE or PFA.

* * * * *